United States Patent [19]

Gillberg-Laforce et al.

[11] Patent Number: 5,618,622
[45] Date of Patent: Apr. 8, 1997

[54] SURFACE-MODIFIED FIBROUS MATERIAL AS A FILTRATION MEDIUM

[75] Inventors: Gunilla E. Gillberg-Laforce, Roswell; Leonid A. Turkevich; Kristi L. Kiick-Fischer, both of Alpharetta, all of Ga.

[73] Assignee: Kimberly-Clark Corporation, Neenah, Wis.

[21] Appl. No.: 497,676

[22] Filed: Jun. 30, 1995

[51] Int. Cl.$^6$ ............................................. D02G 3/00
[52] U.S. Cl. .................... 428/357; 428/375; 428/221; 210/639; 210/507; 210/509; 210/679; 210/777; 210/505; 210/502.1; 442/164
[58] Field of Search ............................. 428/357, 364, 428/375, 198, 395, 221, 224; 210/639, 507, 509, 651, 490, 638, 502.1, 508

[56] References Cited

U.S. PATENT DOCUMENTS

| | | | |
|---|---|---|---|
| 3,016,599 | 1/1962 | Perry, Jr. | 28/78 |
| 3,322,488 | 5/1967 | Feeman | 8/115.5 |
| 3,341,394 | 9/1967 | Kinney | 161/72 |
| 3,455,853 | 7/1969 | Dekking | 260/174 |
| 3,518,040 | 6/1970 | Caldwell et al. | 8/115.5 |
| 3,649,346 | 3/1972 | Bridgeford et al. | 117/138.8 F |
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,737,337 | 6/1973 | Hashimoto et al. | 210/490 |
| 3,755,527 | 8/1973 | Keller et al. | 264/210 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,978,185 | 8/1976 | Buntin et al. | 264/93 |
| 4,018,678 | 4/1977 | Peniston | 210/502 |
| 4,064,605 | 12/1977 | Akiyama et al. | 284/103 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,118,531 | 10/1978 | Hauser | 428/224 |
| 4,170,696 | 10/1979 | Hirohara et al. | 521/29 |
| 4,225,312 | 9/1980 | Lewis et al. | 821/115.6 |
| 4,238,334 | 12/1980 | Halbfoster | 210/777 |
| 4,265,927 | 5/1981 | Ericksson et al. | 427/2 |
| 4,331,541 | 5/1982 | Akiyama et al. | 210/679 |
| 4,340,563 | 7/1982 | Appel et al. | 264/518 |
| 4,351,909 | 9/1982 | Stevens | 521/28 |
| 4,364,393 | 12/1982 | Yasnitsky et al. | 128/335.5 |
| 4,405,297 | 9/1983 | Appel et al. | 425/72 |
| 4,434,204 | 2/1984 | Hartman et al. | 428/198 |
| 4,501,835 | 2/1985 | Berke | 210/654 |
| 4,627,811 | 12/1986 | Greiser et al. | 425/72 |
| 4,644,045 | 2/1987 | Fowells | 526/348 |
| 4,663,220 | 5/1987 | Wisneski et al. | 428/221 |
| 4,666,452 | 5/1987 | Nohr et al. | 8/115.52 |
| 4,875,901 | 10/1989 | Payet et al. | 8/115.52 |
| 4,923,914 | 5/1990 | Nohr et al. | 524/99 |
| 5,006,255 | 4/1991 | Uragami | 210/640 |
| 5,009,667 | 4/1991 | Beck et al. | 8/115.56 |
| 5,032,281 | 7/1991 | Nagamatsu | 210/651 |
| 5,039,421 | 8/1991 | Linder et al. | 210/651 |
| 5,208,111 | 5/1993 | Decher et al. | 428/420 |
| 5,268,004 | 12/1993 | Greak | 8/120 |
| 5,279,614 | 1/1994 | Uchida et al. | 8/115.51 |
| 5,407,581 | 4/1995 | Onodera et al. | 210/508 |

FOREIGN PATENT DOCUMENTS 6-228881  8/1994  Japan.

OTHER PUBLICATIONS

V.A. Wente, "Manufacture of Superfine Organic Fibers", *Navy Research Lab.*, Washington, D.C. NRL Rpt. 4364 (111437), May 25, 1954, U.S. Dept. of Commerce, Office of Technical Services.

R.R. Butin, et al., "Melt Blowing—A One Step Web Process for New Nonwoven products", *Journal of the Tech. Assoc. of The Pulp and Paper Industry*, V. 56, N.4, pp. 74–77, 1973.

V.A. Wente, "Superfine Thermoplastic Fibers", *Industrial & Engin. Chem.*, V. 48, N. 8, pp. 1342–1346, 1956.

A.W. Adamson, "Physical Chemistry of Surfaces", 5th Ed., John Wiley & Sons, Inc. (1990), p. 389.

K. Allmer, et al. "Surface Modification of Polymers I. Vapour Phase Photografting with Acrylic Acid", *Journal of Polymer Science*, Part A. Polymer Chemistry, V. 26. pp. 2099–2111 (1988).

G. Gillberg, et al., "A Microscopic Method To Assess The Spin Finish Distribution On Polyester Yarns", *Journal of Microscopy*, V. 138, Pt. 1, Apr. 1985, RP1–RP2.

J.M. Lane, et al., "Surface Treatmens Of polyolefins", *Progress in Organic Coatings*, 21, (1993) pp. 269–284.

S. Fang Yue–E, et al. "Kinetics of Radiation–Induced Graft Copolymerization of 2–Hydroxyethyl Methacrylate onto Polyethylene Membranes", Journ. of Appl. Polym Sci., V. 38, pp. 821–828 (1989).

W.L.K. Schwoyer, Editor, "Polyelectrolytes for Water and Waste–water Treatment," CRC Press, Boca Raton, 1981.

*Primary Examiner*—Newton Edwards
*Attorney, Agent, or Firm*—William E. Maycock

[57] ABSTRACT

A surface-modified fibrous material which includes hydrocarbon polymer fibers having cationic or anionic groups on the surfaces thereof and coated with a polyelectrolyte having a net charge opposite to that of the cationic or anionic groups on the surfaces of the fibers. The hydrocarbon polymer may be, by way of illustration, a polyolefin, such as polyethylene or polypropylene. The cationic or anionic groups may be carboxylic acid, sulfonic acid groups, or quaternary ammonium groups. Examples of polyelectrolytes include chitosan, poly(methacryloxyethyltrimethylammonium bromide), poly(acrylic acid), and poly(styrene sulfonate). Also disclosed is a method of making the surface-modified fibrous material. The surface-modified fibrous material may be used as a filtration medium for liquids.

2 Claims, No Drawings

SURFACE-MODIFIED FIBROUS MATERIAL AS A FILTRATION MEDIUM

BACKGROUND OF THE INVENTION

The present invention relates to a fibrous material and its use as a filtration medium.

Filtration is the process of separating particles from a fluid suspension (liquid or gas) by passing the fluid through a filter medium (e.g., a septum, membrane, or porous medium). The particles may be coarse or fine. They may even consist of atoms or molecules. The particles may be inorganic or organic in composition and may be natural or biological in origin (examples of the latter include bacteria and viruses).

Such liquid-solid separations are important in the manufacture of chemicals, polymer products, medicinals, drugs and other pharmaceuticals, beverages, and foods; mineral and other metallurgical processing; petroleum refining and processing; water purification and filtration; sewage disposal; the chemical laboratory; specific chemical processes (e.g., the dry-cleaning process); and the operation of machines such as internal combustion engines and refrigeration units.

In a typical filtration process, a filter medium retains most of the solids on or within itself, but allows the fluid being filtered to pass through it unimpeded. A driving force, usually in the form of a static pressure difference across the filter (generated by gravity, vacuum applied downstream, external pressure applied upstream, or by centrifugal force), must be applied to achieve flow through the filter medium (a general review of filtration is contained in C. Dickenson, Editor, "Filters and Filtration Handbook," 2nd Edition, The Trade & Technical Press, Ltd., Morden, Surrey, 1987). For a review of particle removal from liquids, see Chapter 8 in T. H. Meltzer, "Filtration in the Pharmaceutical Industry," Marcel Dekker, New York, 1987.

Filtration often is referred to as a mechanical separation because the separation is accomplished by physical means. This does not preclude the use of chemical or thermal pretreatment to enhance filtration. Cationic flocculants have been used to enhance filtration, but they also can clog the filter medium, especially if used in excess. Similarly, polyelectrolytes have been used extensively in the treatment of water and wastewater, but as flocculants or coagulants prior to sedimentation and filtration (see, for example, W. L. K. Schwoyer, Editor, "Polyelectrolytes for Water and Wastewater Treatment," CRC Press, Boca Raton, 1981).

Particles are collected by filters via the following mechanisms: direct interception, inertial impaction, and diffusion. Collection takes place on the solid elements of the filter. Direct interception occurs when a particle collides head-on with a solid element at the surface of the filter. Inertial impaction results if a particle in the stream fails to negotiate the tortuous path through the filter bed and adheres to a solid element inside the filter. Diffusion occurs when extremely small particles (i.e., particles having diameters less than 1 micrometer) wander via Brownian motion within the flow of the fluid stream, thereby augmenting their chances of intersecting the solid elements forming the filter medium.

The two broad categories of conventional filters are surface-type filters and depth-type filters. The feed to surface filters normally contains at least 1 percent by volume solids, while deep-bed filtration is applied to very dilute suspensions of solids concentrations, e.g., less than 0.1 percent by volume. Surface and depth filtration also have been used together, as in the cartridge filtration of extreme fines, such as bacteria.

These two types of filters function in very different ways. First, surface filtration works via direct interception. Particles larger than the pore size of the medium are stopped at the upstream surface of the filter; their size prevents them from entering and/or passing through the pores. They are, in effect, strained out of the fluid stream. Adsorptive forces, while present, are small in magnitude and unimportant to this filtration process. When surface-type filters are exposed to the flow of a contaminated fluid, the filter quickly clogs due to two processes:

i) The effective pore-size of the medium is reduced, as some of the pores become partially blocked by particles. This pore blocking can be caused by adsorption of small particles within the pores.

ii) A 'cake' of successive layers of solids deposits and builds up on the surface of the medium; the cake itself forms a filter which clogs with time. The selectivity of the filter is thus determined by the contaminant particles and not by the original filter.

Surface filters are of three broad types: screens, edge-type filters (where the flow takes place from the edge inwards), and stacked disc filters (where the flow is between and through filter discs and then into an inner tube).

Second, depth filtration employs a medium of a sufficient thickness so as to filter in its bulk. The filter medium typically is a deep bed with pore sizes much greater than the particles it is meant to remove, so the particles penetrate into the medium. The random path through the depth filter is much longer than that through a surface filter, providing a greater possibility for retention. Retention efficiency in conventional deep-bed filters is achieved by means of a series of low-efficiency particle captures. Adsorptive surface forces (molecular and electrostatic) can enhance attachment to the medium, which then improves retention within the filter.

Depth-type filters generally are made from fibrous, porous, or caked media. Fibrous media constitute a layer, or mat, of numerous fine fibers (e.g., fiber diameters ranging from 0.5 to 30 micrometers). These fibers are randomly oriented, thereby creating the numerous tortuous passages or pores in which the particles are trapped and held by the previously described mechanisms. Commonly used fibrous materials are cellulose, cotton, glass, and synthetics (e.g. rayon, polypropylene).

Either type of filtration may utilize affinity filtration. Affinity filtration, which separates chemically distinct particles, makes special use of electrostatic, hydrophobic, or specific chemical interactions between the particles and the filter medium. Attachment forces often are increased by small amounts of previously deposited particles.

Notwithstanding past improvements in filter media, there still is an opportunity for an improved filter medium, particularly a filter medium adapted for use in depth-filtration processes.

SUMMARY OF THE INVENTION

The present invention addresses some of the difficulties and problems discussed above by providing a filter medium which makes efficacious use in filtration of polyelectrolytes which are incorporated into the filter medium, rather than being utilized as a chemical pretreatment for filtration. The solid elements of the class of filters provided by the present invention are the fibers of a filtration web adapted for use in depth-type filters. The present invention also provides various means by which polyelectrolytes may be incorporated into a depth filter, thereby endowing the fibers with the potential for affinity filtration as described above. For example, molecules that may be filtered by means of the present invention include dyes and other organic molecules, toxic chemicals, ions, and metals having high complexation constants with polyelectrolytes.

Accordingly, the present invention provides a surface-modified fibrous material which includes hydrocarbon polymer fibers having cationic or anionic groups on the surfaces thereof and coated with a polyelectrolyte having a net charge opposite to that of the cationic or anionic groups on the surfaces of the fibers. The hydrocarbon polymer may be, by way of illustration, a polyolefin, such as polyethylene or polypropylene. The cationic groups may be quaternary ammonium groups. The anionic groups may be carboxylic acid or sulfonic acid groups. Examples of polyelectrolytes include chitosan, poly(methacryloxyethyltrimethylammonium bromide), poly(acrylic acid), and poly(styrene sulfonate).

The present invention also provides a method of preparing a surface-modified fibrous material which includes providing a fibrous material including hydrocarbon polymer fibers, treating the fibrous material to provide cationic or anionic groups on the surfaces of the fibers thereof, and treating the fibrous material having cationic or anionic groups on the surfaces thereof with an aqueous solution of a polyelectrolyte of opposite charge.

The surface-modified fibrous material of the present invention may be used as a filtration medium for liquids.

DETAILED DESCRIPTION OF THE INVENTION

The term "fibrous material" is meant to include any material which contains fibers composed of a hydrocarbon polymer. For example, the fibrous material may be a nonwoven sheet or web prepared by any of the processes known to those having ordinary skill in the art. Such processes include wet-laying, dry-laying, and melt-extrusion processes.

The term "melt-extrusion process" as applied to a nonwoven web is meant to include any melt-extrusion process for forming a nonwoven web in which melt-extrusion to form fibers is followed concurrently by web formation on a foraminous support. The term includes, among others, such well-known processes as meltblowing, coforming, spunbonding, and the like. By way of illustration only, such processes are exemplified by the following references, each of which is incorporated herein by reference:

(a) meltblowing references include, by way of example, U.S. Pat. No. 3,016,599 to R. W. Perry, Jr., U.S. Pat. No. 3,704,198 to J. S. Prentice, U.S. Pat. No. 3,755,527 to J. P. Keller et al., U.S. Pat. No. 3,849,241 to R. R. Butin et al., U.S. Pat. No. 3,978,185 to R. R. Butin et al., and U.S. Pat. No. 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Naval Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references include U.S. Pat. No. 4,100,324 to R. A. Anderson et al. and U.S. Pat. No. 4,118,531 to E. R. Hauser; and (c) spunbonding references include, among others, U.S. Pat. No. 3,341,394 to Kinney, U.S. Pat. No. 3,655,862 to Dorschner et al., U.S. Pat. No. 3,692,618 to Dorschner et al., U.S. Pat. No. 3,705,068 to Dobo et al., U.S. Pat. No. 3,802,817 to Matsuki et al., U.S. Pat. No. 3,853,651 to Porte, U.S. Pat. No. 4,064,605 to Akiyama et al., U.S. Pat. No. 4,091,140 to Harmon, U.S. Pat. No. 4,100,319 to Schwartz, U.S. Pat. No. 4,340,563 to Appel and Morman, U.S. Pat. No. 4,405,297 to Appel and Morman, U.S. Pat. No. 4,434,204 to Hartman et al., U.S. Pat. No. 4,627,811 to Greiser and Wagner, and U.S. Pat. No. 4,644,045 to Fowells.

As used herein, the term "hydrocarbon polymer" is meant to include any polymer which results from the polymerization of one or more monomers which contain only carbon and hydrogen. For example, hydrocarbon polymers include polyolefins, such as polyethylene, polypropylene, poly(1-butene), poly(2-butene), poly(1-pentene), poly(2-pentene), poly(3-methyl-1-pentene), poly(4-methyl-1-pentene), and the like; diene polymers, such as 1,2-poly-1,3-butadiene, 1,4-poly-1,3-butadiene, polyisoprene, and the like; polystyrenes; copolymers of the foregoing; and the like. In addition, the term "polymer" is meant to include blends of two or more polymers and random and block copolymers prepared from two or more different monomers.

The term "polyelectrolyte" is used herein to mean a polymer having a high molecular weight and producing large chain-type ions in solutions. The term also is intended to cover complexes of a polyelectrolyte with oppositely charged molecules, e.g., monomers or low molecular weight polymers, such that the net charge of the complex is of the same type as the polyelectrolyte per se.

The polyelectrolyte may be natural or synthetic. Natural polyelectrolytes include, by way of illustration only, polysaccharides, such as chitosan, glycol chitosan, cellulose, sodium carboxymethylcellulose, and sodium carboxymethylhydroxyethylcellulose; dextran sulfates; hyaluronic acid; heparin, chondroitin sulfate, and poly(galacturonic acid). As used herein, the term does not include proteins; such polymers generally may not provide the properties desired and/or have other deficiencies. Proteins, while naturally occurring polyelectrolytes, are limited to containing only specific functional groups (amino and carboxylic acid groups). Furthermore, their use may be undesirable in that they provide a natural substrate for the growth of bacteria.

Synthetic polyelectrolytes include, also by way of illustration only, poly(acrylic acid), poly(methacrylic acid), poly(ethylenesulfonic acid), poly(vinylsulfonic acid), poly(styrenesulfonic acid), poly(vinylphenylsulfuric acid) phenol ester, maleic acid/alkene copolymer, maleic acid/vinyl alkyl ether copolymer, poly(glutamic acid), polylysine, poly(vinyl amine), polyethyleneimine, poly(vinyl-4-alkylpyridinium salt), poly(methylene)-N,N-dimethylpiperidinium salt, poly(vinylbenzyltrimethylammonium salt), poly(dimethyldiallylammonium chloride), poly(N,N,N',N'-tetramethyl-N-p-xylylenepropylenediammoniumchloride), poly(N-ethyl-4-vinylpyridinium bromide), poly(vinyl-butylpyridinium bromide), poly(vinyl-N-methylpyridinium bromide), and poly(methacryloxyethyltrimethylammonium bromide). In general, a synthetic polyelectrolyte may have a weight-average molecular weight of from about 5,000 to about 1,000,000 Daltons. For example, the polyelectrolyte may have a weight-average molecular weight of from about 20,000 to about 100,000 Daltons.

As already noted, the fibrous material may be any material which contains fibers composed of a hydrocarbon polymer. For example, the fibrous material may be a nonwoven sheet or web prepared by a melt-extrusion process, such as meltblowing, coforming, and spunbonding. Meltblown nonwoven webs are particularly useful as filter media because such webs can be made with very small pores. Desirably, the hydrocarbon polymer will be a polyolefin. Because of their commercial importance, polyethylene and polypropylene are especially desired.

The hydrocarbon polymer fibers of which the fibrous material is composed have cationic or anionic groups on the surfaces thereof. Such groups may be formed by any means known to those having ordinary skill in the art. For example, such groups may be formed by a chemical reaction, radiation optionally combined with a chemical reaction, radiation-induced grafting of a charged species, precipitation of a water-insoluble charged compound, and surface segregation of a charged compound in the case of a fibrous material formed by a melt-extrusion process. Specific examples are given below by way of illustration only, and are well known to a person having ordinary skill in the art of surface modifications.

Chemical Reaction
  a. Sulfonation by treatment with chlorosulfonic acid or concentrated sulfuric acid to form sulfonic acid groups. [F. J. B. Calleja, et.al., J Mater. Sci. Lett. 3, 509 (1984), C. Fonseca, et.al., J. Mater. Sci. 20, 3283 (1985), D. A. Olsen and A. J. Osteraas, J. Polym. Sci.: Part A-1, 7, 1921 (1969)]
  b. Gas-phase sulfonation to form sulfonic acid groups. [W. E. Walles, U.S. Pat. No. 3,959,561 (1976)]
  c. Oxidation to form carboxylic acid groups. [D. Briggs, J. Adhesion 13, 287 (1982)]

Radiation
  a. Corona treatment in air to form aldehyde, ketone and acid groups as well as peroxides. [J. M. Lane and D. J. Hourston, Progr. Org. Coatings 21, 269 (1993)]
  b. Corona treatment in the presence of carbon dioxide to form carboxylic acid groups. [J. M. Lane and D. J. Hourston, Progr. Org. Coatings 21, 269 (1993)]
  c. Plasma and corona treatment in the presence of ammonia or nitrogen to give amine an/or ammonium groups. [J. M. Lane and D. J. Hourston, Progr. Org. Coatings 21, 269 (1993)]

Radiation-induced Grafting
  a. Ultraviolet radiation-induced grafting of ionizable monomers such as acrylic acid. [K. Allmer, A. Hult and B. Ranby, J. Polym. Sci. Part A: Polymer Chem. 26, 2099 (1988)]
  b. $^{60}$Co induced radical formation followed by grafting of ionizable vinylmonomers. [Y. E. Fang, T. Y. Shi, W. F. Wang and F. Shi, J. Appl. Polym. Sci. 38, 822 (1989)]
  c. Electron beam-induced grafting of monomers.

Precipitation
  a. Precipitation of cholic acid, dehydrocholic acid, or deoxycholic acid from an acid-saturated, boiling water solution.

Surface Segregation
  a. Surface segregation of a charged compound in the case of a fibrous material formed by a melt-extrusion process. For a description of the phenomenon of surface segregation, see, e.g., U.S. Pat. No. 4,923,914 to Nohr et al. which is incorporated herein by reference.

Electrostatic attraction between the ionic groups of the polyelectrolyte and the oppositely charged groups on a solid surface will lead to a strong adsorption due to the formation of multiple ion-pairs. This type of interaction is extensively used in technological processes such as waste water treatment, flotation and flocculation. It is also well known for those skilled in the art to perform surface modification to introduce ionic or ionizable groups on polymer surfaces. These ionic groups can, in themselves, actively participate in filtration with ion-exchange. However, due to the dynamics of a thermoplastic polymer surface these ionic groups are known to be lost from the surface due to diffusive reorientation of the material, when stored in air for any longer time period, in order to minimize the surface energy of the system. This reorientation is prevented by the adsorption of an oppositely charged polyelectrolyte to the ionic groups on the surface resulting in a more durable functionalization. Due to the high molecular weight of the polyelectrolyte it can also substantially coat and bridge over surface areas of the fibers with an uneven distribution of ionic groups. Another advantage with adsorbing a polyelectrolyte onto the fiber surface is that loops and tails of the polyelectrolyte will extend into the water phase leading to a higher ability to capture oppositely charged particles and/or ions.

Turning now to the method of the present invention, a fibrous material is provided. The fibrous material may be any material which contains fibers composed of a hydrocarbon polymer and desirably is a nonwoven sheet or web prepared by a melt-extrusion process, such as meltblowing, coforming, and spunbonding. More desirably, the fibrous material will be a meltblown nonwoven web, such as a polyethylene or polypropylene meltblown web.

Cationic or anionic groups then are formed at the surfaces of the fibers of which the fibrous material is composed, as already described. The cationic or anionic group-containing fibrous material is then treated with an aqueous solution of a polyelectrolyte. Such treatment may be by any known means, such as dipping and nipping, brushing, spraying, doctor blading, and the like.

The aqueous solution of the polyelectrolyte may be prepared by methods known to those having ordinary skill in the art. Weak acidic or basic groups may be in neutral form or in ionized form by changing the pH of the polyelectrolyte solution. Although the solids content of the solution may vary over a wide range, levels of from about 0.01 percent to about 10 percent by weight are typically used. Of course, solutions having lower or higher concentrations of polyelectrolyte may be used, if desired.

The present invention is further described by the examples which follow. Such examples, however, are not to be construed as limiting in any way either the spirit or the scope of the present invention.

EXAMPLE 1

Samples of two fibrous materials were employed. The first was a meltblown polyethylene nonwoven web (Sample 1A) and the second was a meltblown polypropylene nonwoven web (Sample 1B). Each web had a basis weight of 1.0 ounce per square yard or osy (about 34 grams per square meter or gsm).

Sulfonate groups were introduced on the fiber surfaces of a 9-inch×12-inch (about 23-cm×30-cm) sample of each web by gas-phase sulfonation performed by Coalition Technologies Limited according to their proprietary technology, U.S. Pat. No. 3,059,561. The samples were neutralized with a solution containing 1 percent ammonia in water, washed with deionized water, and air-dried. Each web sample then was immersed in an aqueous solution containing 1 percent by weight chitosan (Sigma C-3646, 89.3% deacetylation, Sigma Chemical Company, St. Louis, Mo.) to which acetic acid had been added to adjust the pH of the solution to 4.5. The container containing the solution and the web was placed in an ultrasonic bath for five minutes to facilitate the wetting out of the web. The samples next were immersed in double distilled water under light agitation, followed by nipping with an Atlas laboratory wringer at a pressure of 30 pounds. The samples were next hung to dry in a laboratory chemical flow hood. Other web samples were similarly treated with a 1 percent by weight aqueous solution of poly(diallyldimethylammonium chloride) (PDDMAC) having a weight-average molecular weight of 24,000 Daltons (Polyscience, Inc.).

Each web then was analyzed by electron spectroscopy for chemical analysis (ESCA). X-ray photoelectron spectra were acquired using an M-Probe Surface Science Instrument spectrometer, model 2730. All samples were mounted onto a standard Al sample stage using double-sided adhesive tape. Spectra were acquired using a monochromatic Al x-ray source. An electron flood gun was used during analysis to compensate for sample charging. The ESCA results are summarized in Table 1.

TABLE 1

Summary of BOCA Results

| | | Atom Percent | | | | |
|---|---|---|---|---|---|---|
| Sample | Treatment | O | C | S | N | Cl |
| 1A | None | 9.0 | 83.2 | 1.2 | 0.0 | 4.9 |
| 1A | Washed | 7.1 | 87.2 | 1.2 | 0.0 | 4.6 |
| 1A | Chitosan | 18.5 | 74.1 | 1.9 | 2.9 | 2.6 |
| 1A | PPDMAC | 10.2 | 82.5 | 2.2 | 1.6 | 3.5 |
| 1B | None | 9.3 | 87.5 | 0.7 | 0.0 | 2.5 |
| 1B | Washed | 7.1 | 88.7 | 1.0 | 0.0 | 2.1 |
| 1B | Chitosan | 17.3 | 76.1 | 1.0 | 3.6 | 2.0 |
| 1B | PPDMAC | 6.9 | 86.0 | 1.3 | 2.2 | 3.7 |

The data in Table 1 clearly demonstrate the presence of chitosan and poly(diallyldimethylammonium chloride), respectively, on the web samples. That is, the increased oxygen atom percent values and the appearance of nitrogen after treatment showed that the cationic polyelectrolytes were adsorbed on the sulfonated nonwoven webs.

EXAMPLE 2

Samples of a 0.5 osy (about 17 gsm) meltblown polypropylene nonwoven web were soaked for one minute in 50 ml of a 0.5 percent by weight aqueous solution of octylcresoxyethoxyethyldimethylbenzylammonium chloride and then nipped with an Atlas laboratory wringer at a pressure of 30 pounds to remove excess solution. The samples were immediately immersed in 200 ml of a 0.25 percent by weight solution of poly(acrylic acid) having a weight-average molecular weight of 750,000 Daltons (Sample 2A) in 0.02M aqueous sodium chloride, a 1 percent by weight aqueous solution of poly(acrylic acid) having a weight-average molecular weight of 50,000 Daltons (Sample 2B), and a 1 percent by weight aqueous solution of poly(styrene sulfonate) having a weight-average molecular weight of 200,000 Daltons (Sample 2C), respectively. The samples were nipped as before and air-dried by hanging in a fume hood. A sample treated with octylcresoxyethoxyethyldimethylbenzylammonium chloride only was employed as a control (Sample 2D).

The durability of the polyelectrolytes on the surfaces of the fibers was assessed by comparing the wettability of the sample before and after a five-minute wash in 50 ml of water under agitation with a wrist-action shaker at the lowest setting. The water wettability was tested by gently placing drops of distilled water onto the sample surface. The sample was regarded water wettable if the applied water drops were immediately absorbed into the fabric. Before washing, all samples were immediately wettable by water, except for Sample 2-D which exhibited delayed wetting, i.e., it took two to three minutes before the water drops were absorbed. After washing, the water wettability of the samples was as follows:

Sample 2A—delayed wetting (see above);

Sample 2B—delayed wetting;

Sample 2C—rapid but heterogenous, i.e, water drops applied to some areas were absorbed immediately, while other areas showed delayed wetting; and Sample 2D—not wettable.

The ability of the nonwoven webs modified with anionic polyelectrolytes to entrap cationic particles was studied by the use of amine-modified monodisperse 378-nm polystyrene particles from Seradyn Uniform Latex Particles, Indianapolis, Ind. The change in particle concentration of a 5-ml aliquot of a particle solution having a particle concentration of $2.5 \times 10^9$ particles per ml filtered through a 25-mm diameter disk of treated nonwoven web was determined using photon correlation spectroscopy, based on the relative intensity of scattered light measured in counts/sec using a Coulter Model N4 MD Sub-micron particle analyzer at 90°. Untreated nonwoven web was employed as a control (Sample 2E). The results are summarized in Table 2.

TABLE 2

Summary of Particle Counting Results

| | Particle Sol'n Counts/Sec | | Percent | No. Part. |
|---|---|---|---|---|
| Sample | Before Filt. | After Filt. | Removed | Removed |
| 2A | $4.9 \times 10^5$ | $3.7 \times 10^5$ | 25 | $2.3 \times 10^9$ |
| 2B | $4.9 \times 10^5$ | $4.1 \times 10^5$ | 16 | $1.6 \times 10^9$ |
| 2C | $4.9 \times 10^5$ | $4.2 \times 10^5$ | 14 | $1.3 \times 10^9$ |
| 2E[a] | $4.9 \times 10^5$ | $4.8 \times 10^5$ | 2 | $0.2 \times 10^9$ |

[a]Two layers of nonwoven web were employed.

EXAMPLE 3

The procedure of Example 2 was repeated, except that the sample of meltblown polypropylene nonwoven web was treated first with a 0.5 percent by weight aqueous solution of $C_{14}$–$C_{16}$ sulfate and then with a 1 percent by weight aqueous solution of poly(dimethyldiallylammonium chloride) having a weight-average molecular weight of 240,000 Daltons. The wettability characteristics of the sample before and after washing were essentially the same as for Sample 2C in Example 2. The filtration efficiency was determined by using 300-nm anionic (Seradyn) polystyrene particles using the same procedure as described in Example 2. The particle counts before and after the filtration were $9.8 \times 10^4$ and $6.2 \times 10^4$ counts per second, respectively, which corresponds to a 38 percent reduction in particle content.

EXAMPLE 4

A 1.6-osy (about 54 gsm) spunbonded polypropylene nonwoven web was prepared from polypropylene which contained 1 percent by weight of a surface-segregating melt additive, dimethyl 4-hexadecylphenylmethyl {2,2-dimethyl-3-[1,3,3,3-tetramethyl-1-(trimethylsiloxy)disiloxanyl)-propoxy]propyl} ammonium p-toluenesulfonate. The preparation of the compound and its use as a melt additive in the preparation of nonwoven webs are described in U.S. application Ser. No. 08/249,788 to Ronald S. Nohr and J. Gavin MacDonald, which is incorporated herein by reference.

A sample of the web as prepared was retained as a control (Sample 4A). Another sample of the web was treated by vacuum extraction with a 0.2 percent by weight solution of poly(acrylic acid) having a weight-average molecular weight of 750,000 Daltons in 0.02M aqueous sodium chloride (Sample 4B), and a further sample of the web was treated with a pH 12, 0.2 percent by weight aqueous solution of a 35:1 polyelectrolyte complex formed between a poly(acrylic acid) having a weight-average molecular weight of 750,000 Dalton (35 parts by weight) and poly(methacryloxyethyltrimethylammonium bromide) (1 part by weight)(Sample 4C). Vacuum extraction was performed by placing a 49-mm diameter 0.5 osy polypropylene meltblown disk in a Buchner funnel, applying a vacuum, and then pouring aliquots of the polyelectrolyte solution through the nonwoven disk. Each sample was rinsed by pouring small aliquots of 0.02M sodium chloride solution through the nonwoven disk in a similar manner; each sample was dried in an oven at 55° C. The presence of the polyelectrolyte or its complex on the surfaces of the fibers was verified by ESCA. Samples of treated webs rinsed with the sodium chloride solution then were sonicated in water for 10 minutes, dried as before, and analyzed by ESCA. The ESCA data are summarized in Table 3. The sodium chloride solution rinse and sonication in water are referred to in the Table as "NaCl rinse" and "Water wash", repsectively.

TABLE 3

Summary of ESCA Results

| Sample | Treatment | Atom Percent | | | |
|--------|-----------|------|------|-----|-----|
| | | O | C | Si | N |
| 4A | None | 12.0 | 78.3 | 9.7 | ND[a] |
| 4B | NaCl rinse | 15.4 | 78.2 | 6.4 | ND |
| | Water wash | 14.9 | 79.6 | 5.5 | ND |
| 4C | NaCl rinse | 16.6 | 72.2 | 2.7 | 4.8 |
| | Water wash | 11.5 | 82.9 | 5.6 | ND |

[a]Not detected.

The increased oxygen levels and decreased silicon levels in Samples 4B and 4C are due to the presence on the surfaces of the webs of the poly(acrylic acid) (Sample 4B) or its complex (Sample 4C). The latter sample showed a significant level of nitrogen due to the presence of the cationic polyelectrolyte. Sonicating the samples in water for 10 minutes led to some loss of polyelectrolyte, but no significant depression of the surface tension of the washing liquid, thereby indicating the durability of the chemisorbed polyelectrolyte.

EXAMPLE 5

The procedure of Example 4 was repeated, except that the spunbonded polypropylene nonwoven web was replaced with a meltblown polypropylene nonwoven web which had been treated by vacuum extraction with a 0.5 percent by weight aqueous solution of octylcresoxyethoxyethyldimethylbenzylammonium chloride. Essentially the same results as reported in Example 4 were obtained.

EXAMPLE 6

In this and the following examples, a polypropylene film was employed for convenience in sample handling. The film was prepared by Edison Plastics Company (Newport News, Va.) from Escorene® 3445 polypropylene (Exxon Chemical Americas, Houston, Tex.).

A 1 percent by weight dispersion of didodecyldimethylammonium bromide was prepared by adding four drops of hexanol to 40 ml of the dispersion and vigorously stirring the solution for 30 minutes using a magnetic stirrer. A sample of the polypropylene film (2 inches×2 inches or about 5 cm×5 cm) was dipped in the dispersion and allowed to air dry. A 50-micrometer thick liquid layer of a 1 percent by weight solution of a poly(acrylic acid) having a weight-average molecular weight of 750,000 Daltons was applied to the film by means of an Erichsen™ slot applicator. The resulting coated film was air dried to give Sample 6A. The coating procedure was repeated with a 1 percent by weight solution of a poly(acrylic acid) having a weight-average molecular weight of 50,000 Daltons to give Sample 6B. For each sample, the coating distribution was assessed by gas-phase iodine staining as described in G. Gillberg et. al., *Journal of Microscopy*, Vol. 138, Pt 1, RPI (1985) and ESCA. Iodine staining and ESCA both suggested that the coating was uneven in distribution, although the unevenness was less pronounced with the higher molecular weight poly(acrylic acid). However, each coating was substantive to the water wash described in Example 2.

Similar results were obtained upon replacing the didodecyldimethylammonium bromide with octadecyltrimethylammonium bromide, provided the solution temperature was greater than 36° C. However, the polyelectrolyte coating was more uneven than the coatings obtained through the use of didodecyldimethylammonium bromide.

EXAMPLE 7

A sample of polypropylene film was placed for about five minutes in a boiling aqueous saturated solution of cholic acid at a concentration of approximately 1 g/l. At 15° C., the solubility of cholic acid in water is listed in the Merck Index (§ 2206) as 0.28 g/l. While the solubility was increased in boiling water, solid cholic acid remained visible. The film then was removed from the boiling solution and allowed to cool. The film appeared to be discolored and precipitated cholic acid on the surface of the film was visible when the film was viewed under a microscope. The precipitated cholic acid was not removed by multiple rinsings with distilled water. The presence of cholic acid on the surface of the film was confirmed by ESCA; the surface oxygen concentration had increased from 1.0 atomic percent to 2.3 atomic percent. The contact angle of a water drop placed on the surface was 76°, compared with a contact angle of 93° for virgin polypropylene film; for the measurement of contact angles, see, e.g., W. C. Bigelow, D. L. Pickett, and W. A. Zisman, *J. Colloid Sci.*, 1, 513 (1946) and A. W. Adamson, "Physical Chemistry of Surfaces," 5th Edition, Wiley Interscience, New York, 1990, page 389.

A sample of cholic acid-treated film was placed for about one minute in a 0.1 percent by weight aqueous solution of poly(methacryloxyethyltrimethylammonium bromide), removed, and rinsed with distilled water. Iodine staining indicated the uniform adsorption of the polyelectrolyte on the surface of the film. The contact angle of a drop of water placed on the film was 70°, corroborating the presence of the polyelectrolyte.

A dilute aqueous solution of chitosan (from crab shells, Sigma C-3646, Sigma Chemical Company, St. Louis, Mo.) was prepared by dissolving 1 g of the chitosan in 200 g of 20 percent by weight acetic acid solution. Dissolution was aided by sonication, swirling, and warming on a hot plate. The resulting solution then was diluted 200:1 with distilled water. A sample of the cholic acid-treated film was immersed for about one minute in the diluted chitosan solution, removed, and rinsed with distilled water. Iodine staining indicated a nonuniform adsorption of the polyelectrolyte on the surface of the film. The contact angle of a drop of water placed on the chitosan-coated film was 79° C.

EXAMPLE 8

The procedure of Example 7 was repeated, except that the cholic acid was replaced with dehydrocholic acid at a concentration of 2 g/l to give similar results. The presence of dehydrocholic acid on the surface of the film was confirmed by ESCA; the surface oxygen concentration had increased from 1.0 atomic percent to 6.7 atomic percent. The contact angle of a drop of water placed on the surface of the treated film was 70°.

The dehydrocholic acid-treated film was successfully coated with poly(methacryloxyethyltrimethylammonium bromide) and chitosan as described in Example 7. In each case, iodine staining indicated the uniform and nonuniform adsorption, respectively, of polyelectrolyte. Water drop contact angles were 71° and 73°, respectively.

EXAMPLE 9

The procedure of Example 7 was repeated, except that the cholic acid was replaced with deoxycholic acid. The presence of dehydrocholic acid on the surface of the film was confirmed by ESCA; the surface oxygen concentration had increased from 1.0 atomic percent to 4.9 atomic percent. The contact angle of a drop of water placed on the surface of the treated film was 73°.

The dehydrocholic acid-treated film was successfully coated with poly(methacryloxyethyltrimethylammonium bromide) and chitosan as described in Example 7. In each case, iodine staining indicated the uniform and nonuniform adsorption, respectively, of polyelectrolyte. Water drop contact angles were 60° and 65°, respectively.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A surface-modified fibrous material comprising hydrocarbon polymer fibers having anionic carboxylic acid or sulfonic acid groups on the surfaces thereof and coated with a polyelectrolyte which is chitosan.

2. A surface-modified fibrous material comprising hydrocarbon polymer fibers having anionic carboxylic acid or sulfonic acid groups on the surfaces thereof and coated with a polyelectrolyte which is poly(methacryloxyethyltrimethylammonium bromide).

* * * * *